(12) United States Patent
Chu

(10) Patent No.: US 11,015,744 B2
(45) Date of Patent: May 25, 2021

(54) COMPOSITE TUBE

(71) Applicant: Schlemmer Holding GmbH, Poing (DE)

(72) Inventor: Van Ngoc Chu, Poing (DE)

( * ) Notice: Subject to any disclaimer, the term of this patent is extended or adjusted under 35 U.S.C. 154(b) by 27 days.

(21) Appl. No.: 16/493,990

(22) PCT Filed: Feb. 7, 2018

(86) PCT No.: PCT/EP2018/053110
§ 371 (c)(1),
(2) Date: Sep. 13, 2019

(87) PCT Pub. No.: WO2018/166723
PCT Pub. Date: Sep. 20, 2018

(65) Prior Publication Data
US 2020/0400254 A1 Dec. 24, 2020

(30) Foreign Application Priority Data

Mar. 17, 2017 (DE) ...................... 10 2017 105 787.0

(51) Int. Cl.
*H02G 3/04* (2006.01)
*F16L 11/11* (2006.01)
*B29C 48/13* (2019.01)

(52) U.S. Cl.
CPC ............ *F16L 11/11* (2013.01); *H02G 3/0468* (2013.01); *B29C 48/13* (2019.02)

(58) Field of Classification Search
CPC ........... F16L 25/0036; F16L 9/06; F16L 9/22; H02G 3/04; H02G 3/0468

(Continued)

(56) References Cited

U.S. PATENT DOCUMENTS 6,034,329 A * 3/2000 Kawamura ......... B60R 16/0215
138/162
6,078,009 A * 6/2000 Kawamura .......... H02G 3/0468
138/162

(Continued)

FOREIGN PATENT DOCUMENTS

DE 102005060221 A1 7/2007
DE 102014116447 A1 5/2016

(Continued)

OTHER PUBLICATIONS

Japan Patent Office, Office Action Issued in Application No. 2019572281, dated Nov. 25, 2020, 8 pages.

(Continued)

*Primary Examiner* — Patrick F Brinson
(74) *Attorney, Agent, or Firm* — Alleman Hall Creasman & Tuttle LLP

(57) ABSTRACT

The invention relates to a composite tube, in particular a corrugated tube, comprising a first wall section produced from a first plastic material, a second wall section produced from a second plastic material different from the first plastic material, and a third wall section produced from a third plastic material different from the first plastic material and the second plastic material, the first wall section, the second wall section, and the third wall section being adjacently arranged in a peripheral direction of the composite tube, the third wall section being arranged between the first wall section and the second wall section and connecting the first wall section to the second wall section, and the first wall section, the second wall section, and the third wall section respectively extending in a radial direction of the composite tube over an entire wall thickness thereof.

10 Claims, 8 Drawing Sheets

(58) Field of Classification Search
USPC ....... 138/121, 118, 156, 128, 169, 162, 166, 138/167, 168; 174/72 A
See application file for complete search history.

(56) References Cited

U.S. PATENT DOCUMENTS

| | | | |
|---|---|---|---|
| 6,488,053 B1* | 12/2002 | Tadokoro | F16L 11/15 |
| | | | 138/110 |
| 6,843,276 B2* | 1/2005 | Tadokoro | H02G 3/0468 |
| | | | 138/121 |
| 6,938,645 B2* | 9/2005 | Domingues Duarte | ..................... |
| | | | B29C 48/13 |
| | | | 138/156 |
| 9,163,756 B2* | 10/2015 | Sugiyama | F16L 11/11 |
| 9,759,360 B2* | 9/2017 | Chu | B29C 48/13 |
| 10,122,158 B2* | 11/2018 | Chu | H02G 3/0468 |
| 10,193,315 B2 | 1/2019 | Chu | |
| 2009/0140105 A1* | 6/2009 | Baverel | B29C 48/10 |
| | | | 248/49 |
| 2014/0027002 A1* | 1/2014 | Sugiyama | H02G 3/0468 |
| | | | 138/121 |
| 2017/0030498 A1 | 2/2017 | Chu | |
| 2017/0363229 A1 | 12/2017 | Barten et al. | |

FOREIGN PATENT DOCUMENTS

| | | | |
|---|---|---|---|
| DE | 102015104256 A1 | 9/2016 | |
| EP | 2431642 A2 * | 3/2012 | ............. F24D 3/146 |
| EP | 3125383 A1 | 2/2017 | |
| JP | S60161786 U | 10/1985 | |
| JP | 2002354629 A | 12/2002 | |
| JP | 2003526056 A | 9/2003 | |
| JP | 2012161130 A | 8/2012 | |
| WO | 8907219 A1 | 8/1989 | |
| WO | 2016042134 A1 | 3/2016 | |
| WO | 2016150839 A1 | 9/2016 | |

OTHER PUBLICATIONS

Korean Intellectual Property Office, Office Action Issued in Application No. 10-2019-7029293, dated Oct. 29, 2020, Korea, 13 Pages.

* cited by examiner

COMPOSITE TUBE

FIELD

The present invention relates to a composite tube, in particular a corrugated tube.

BACKGROUND

Corrugated tubes or corrugated pipes can in particular be used in automotive engineering as protective conduits for cables, such as electrical lines. For assembly, the cables are pulled, pushed or laid into the corrugated tube.

DE 10 2015 104 256 A1 describes a corrugated pipe made of plastic for sheathing lines. Along its outer periphery, the corrugated pipe comprises a corrugation with radially protruding regions and with regions shifted inward with respect to the radially protruding regions. The radially protruding regions consist of a harder plastic material than the regions shifted radially inward. By means of the softer plastic material, the flexibility of the corrugated pipe can be adjusted, and the wear properties thereof can be adjusted by means of the harder plastic material. The plastic materials used must be selected such that they are suitable for producing chemical and/or physical interactions with one another so that the softer plastic material connects to the harder plastic material.

SUMMARY

With this as the background, an object of the present invention consists in providing an improved composite tube.

Accordingly, a composite tube, in particular a corrugated tube, is proposed. The composite tube comprises a first wall section produced from a first plastic material, a second wall section produced from a second plastic material different from the first plastic material, and a third wall section produced from a third plastic material different from the first plastic material and the second plastic material. The first wall section, the second wall section, and the third wall section are arranged next to one another in a peripheral direction of the composite tube, the third wall section being arranged between the first wall section and the second wall section and connecting the first wall section to the second wall section. The first wall section, the second wall section, and the third wall section respectively extend in a radial direction of the composite tube over an entire wall thickness thereof.

As a result of the third wall section being provided, it is possible to produce the first wall section and the second wall section from two plastic materials that cannot be connected directly to one another. This results in great variation possibilities in the selection of the first plastic material and of the second plastic material, whereby the mechanical properties and/or the wear properties of the composite tube can be adjusted in wide ranges. As a result, the field of application of the composite tube can be significantly increased in comparison to the known composite tubes.

The first wall section is preferably firmly bonded to the third wall section, and the third wall section is firmly bonded to the second wall section. In the case of firmly bonded connections, the connection partners are held together by atomic or molecular forces. Firmly bonded connections are non-releasable connections that can only be separated by destroying the connecting means, in this case the third wall section, and/or the connection partners, in this case the first wall section and the second wall section.

The composite tube is preferably produced by means of a multi-component extrusion method. In the production of the composite tube, the first plastic material, which can also be called the primary material, can be extruded by means of a main extruder. The second plastic material can be supplied to the main extruder by means of a first ancillary extruder. The third plastic material is, for example, supplied to the main extruder by means of a second ancillary extruder. The composite tube can also comprise more than three plastic materials. For example, the composite tube may have four or five different plastic materials. For the additional plastic materials, additional ancillary extruders may be provided.

The radial direction is preferably oriented from a center axis or axis of symmetry of the composite tube in the direction of an inner wall. The peripheral direction can be oriented clockwise or counterclockwise. The peripheral direction is preferably oriented in parallel to a preferably circular inner wall of the composite tube. The first wall section, the second wall section, and the third wall section being arranged next to one another in the peripheral direction is to be understood to mean that as viewed in the peripheral direction, a first wall section respectively alternates with a second wall section, wherein a third wall section is arranged between each first wall section and each second wall section.

The first wall section, the second wall section, and the third wall section respectively extending in the radial direction over the entire wall thickness of the composite tube is to be understood to mean that as viewed in the radial direction, the first plastic material, the second plastic material, and the third plastic material are ideally arranged not above one another but only next to one another. That is to say, as viewed in the radial direction, the first wall section is produced as a single piece of material from the first plastic material, the second wall section is produced as a single piece of material from the second plastic material, and the third wall section is produced as a single piece of material from the third plastic material. That is to say, the first wall section is free of the second plastic material and the third plastic material, the second wall section is free of the first plastic material and the third plastic material, and the third wall section is free of the first plastic material and the second plastic material.

The first wall section, the second wall section, and the third wall section respectively extending in the radial direction over the entire wall thickness of the composite tube may however also be understood to mean that as viewed in the radial direction, a very thin, in particular film-like, layer of the third plastic material is arranged on and/or under the second plastic material and/or on and/or under the third plastic material. That is to say, as viewed in the radial direction, the third wall section may be arranged at least in sections above and/or below the third wall section and/or above and/or below the second wall section. In terms of production technology, it is possible for this very thin layer of the third plastic material to form. The third wall section may then have a cross-section with a T-shaped or a double-T-shaped or I-shaped geometry. Preferably, however, the third wall section does not completely surround the first wall section and/or the second wall section. The first wall section, the second wall section, and the third wall section are in particular arranged next to one another at least in sections as viewed in the peripheral direction of the composite tube.

According to one embodiment, the composite tube furthermore comprises a plurality of first wall sections, second wall sections, and third wall sections, wherein each first wall section is arranged between two third wall sections and each second wall section is arranged between two third wall sections.

The number of first wall sections, second wall sections, and third wall sections is arbitrary. The number of first wall sections preferably matches the number of second wall sections. The number of third wall sections is preferably twice as large as the number of first wall sections or of second wall sections. For example, twelve first wall sections and twelve second wall sections as well as twenty-four third wall sections are provided. Each first wall section is enclosed on both sides by two third wall sections, and each second wall section is also enclosed on both sides by two third wall sections. As viewed in the radial direction, the first wall section preferably has a wedge-shaped geometry. That is to say, the cross-section of the first wall section increases from the axis of symmetry as viewed in the radial direction. The second wall section preferably has one width as viewed in the radial direction. The second wall section may have a polygonal cross-section. The second wall section may however have a cross-section of any geometry. For example, the second wall section may also have a zigzag-shaped cross-section. Like the second wall section, the third wall section preferably also has one width as viewed in the radial direction. Like the second wall section, the third wall section may have a cross-section of any geometry.

According to another embodiment, the first wall section, the second wall section, and the third wall section extend in a longitudinal direction of the composite tube and are arranged in parallel to one another.

The longitudinal direction is oriented in parallel to the axis of symmetry. The radial direction is positioned orthogonally to the longitudinal direction. The first wall section, the second wall section, and the third wall section thus form plastic strips arranged next to one another and extending in the longitudinal direction or in an axial direction of the composite tube.

According to another embodiment, the second plastic material has different properties than the first plastic material.

The second plastic material is in particular softer than the first plastic material. As a result, the flexibility of the composite tube can be increased with high wear resistance. This extends the field of application of the composite tube. However, the differing properties may also only be different colors. The differing properties may also be different mechanical properties.

According to another embodiment, the third plastic material acts as a bonding agent between the first plastic material and the second plastic material.

Two plastic materials that cannot be mixed with one another, that can only be mixed with one another with difficulty, and/or that cannot be connected to one another can be connected to one another by means of a bonding agent. This allows free selection of the material for the first plastic material and the second plastic material.

According to another embodiment, the first plastic material is a polyamide, the second plastic material is a thermoplastic elastomer or an ethylene tetrafluoroethylene copolymer, and the third plastic material is a modified polyolefin.

The first plastic material, the second plastic material, and the third plastic material may however also be any other plastic materials. In order to produce a modified polyolefin, a previously insoluble polyolefin is chemically modified such that it is soluble in organic solvents. As a result, the modified polyolefin is suitable for connecting to one another plastic materials that cannot be directly connected to one another.

According to another embodiment, the composite tube furthermore comprises wave valleys and wave crests alternating in a longitudinal direction of the composite tube.

The wave crests and wave valleys are positioned at a uniform distance from each other in the longitudinal direction. The wave valleys and wave crests are arranged in such a way that one wave crest is respectively arranged between two wave valleys and one wave valley is respectively arranged between two wave crests.

According to another embodiment, the first wall section extends in the radial direction beyond the second wall section.

In particular, the first wall sections and the second wall sections form a circumferential outside corrugation in the peripheral direction of the composite tube. As a result of the first wall sections produced from the harder first plastic material extending in the radial direction beyond the wall sections produced from the softer second plastic material, wearing of the second wall sections is prevented. By means of the material properties of the second plastic material of the second wall sections, the flexibility of the composite tube can be adjusted. The first plastic material preferably has a Shore D hardness in a range of preferably 40 to 90, and the second plastic material has a Shore A hardness in a range of preferably 10 to 70. The Shore hardness is a material characteristic value for elastomer plastics and is defined in the standards DIN EN ISO 868 and DIN ISO 7619-1.

According to another embodiment, the first wall section has a first corrugated tube shell, a second corrugated tube shell, and a joint section at which the first corrugated tube shell and the second corrugated tube shell are pivotably connected to one another, wherein the second wall sections form an elastically deformable sealing lip.

The composite tube can preferably be brought from an open or folded-open state, in which the first corrugated tube shell and the second corrugated tube shell are preferably arranged next to one another, into a closed or folded-together state, in which the second corrugated tube shell is arranged at least in sections within the first corrugated tube shell. In order to form a wiring harness, cables can be laid into the open composite tube, which is closed after the cables are inserted. As a result, pushing or pulling the cables through the composite tube can be dispensed with. The first corrugated tube shell, the second corrugated tube shell, and the joint section are preferably formed from a single piece of material. The second wall section may also be called a sealing lip. By means of the sealing lip, damage to the cables during insertion in the composite tube and during operation of the composite tube can be prevented since the softer second plastic material does not damage the cables. Alternatively, the joint section may also be produced from a different plastic material than the corrugated tube shells. For example, the corrugated tube shells may be produced from the first plastic material and the joint section may be produced from the second plastic material. The joint section is then a second wall section of the composite tube. A third wall section produced from the third plastic material may then respectively be provided between the joint section and the corrugated tube shells.

According to another embodiment, the second wall section has a first lip section provided on the first corrugated tube shell and a second lip section which is separate from the first lip section and provided on the second corrugated tube shell.

Alternatively, such a lip section may also be provided on only one of the corrugated tube shells. The third wall section is provided between the first corrugated tube shell and the first lip section, and another third wall section is provided between the second lip section and the second corrugated tube shell. The second lip section being separate from the first lip section is to be understood to mean that a slit is provided between the first lip section and the second lip section. The slit may, for example, be introduced into the composite tube by means of a cutting device after or during extrusion of the composite tube.

Additional possible implementations of the composite tube also include not explicitly mentioned combinations of features or embodiments described above or below with respect to the exemplary embodiments. In this respect, the person skilled in the art will also add individual aspects as improvements or additions to the respective basic form of the composite tube.

BRIEF DESCRIPTION OF THE DRAWINGS

Further advantageous designs or aspects of the composite tube are the subject matter of the dependent claims and of the exemplary embodiments of the composite tube described below. The composite tube is explained in more detail below based on preferred embodiments with reference to the appended figures.

Unless otherwise indicated, identical or functionally identical elements are provided with the same reference signs in the figures.

DETAILED DESCRIPTION

Figure 1:
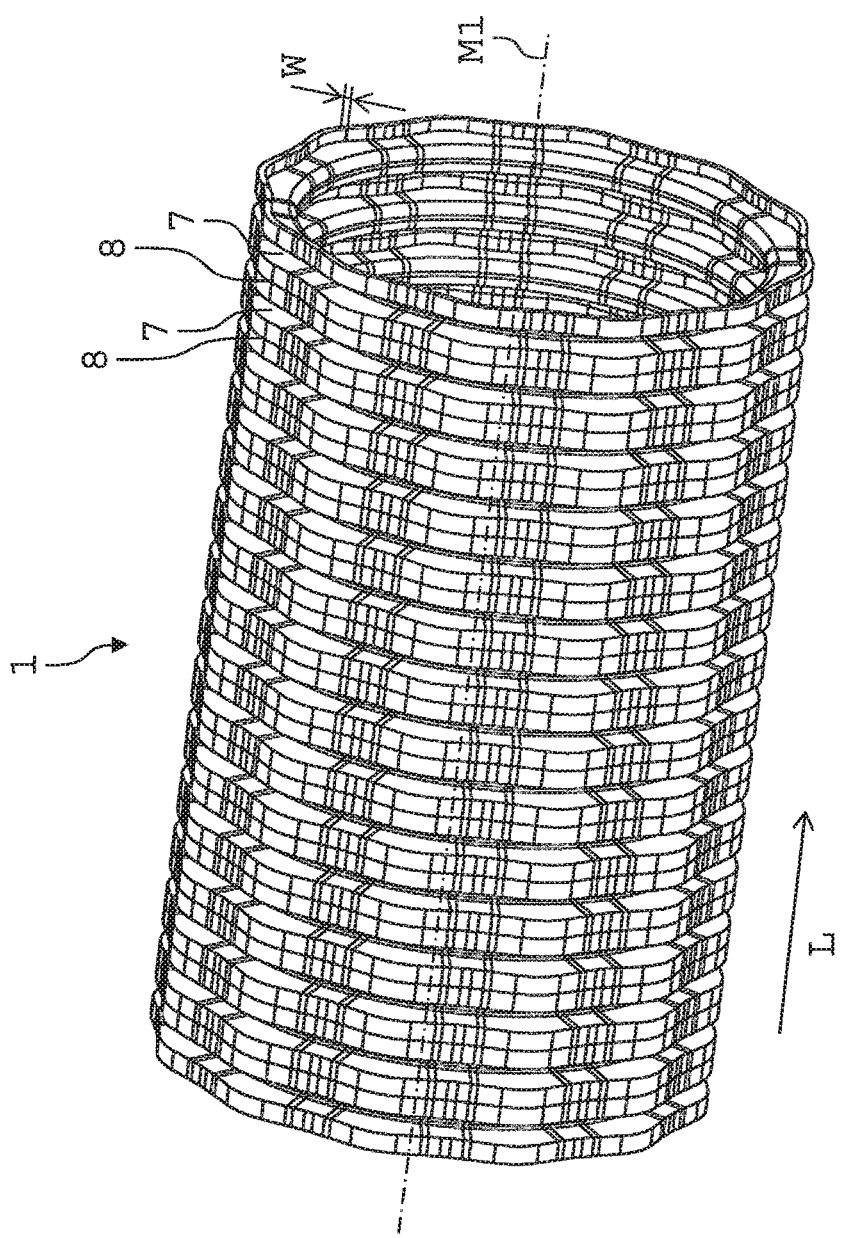
FIG. 1 shows a schematic perspective view of an embodiment of a composite tube.
Figure 2:
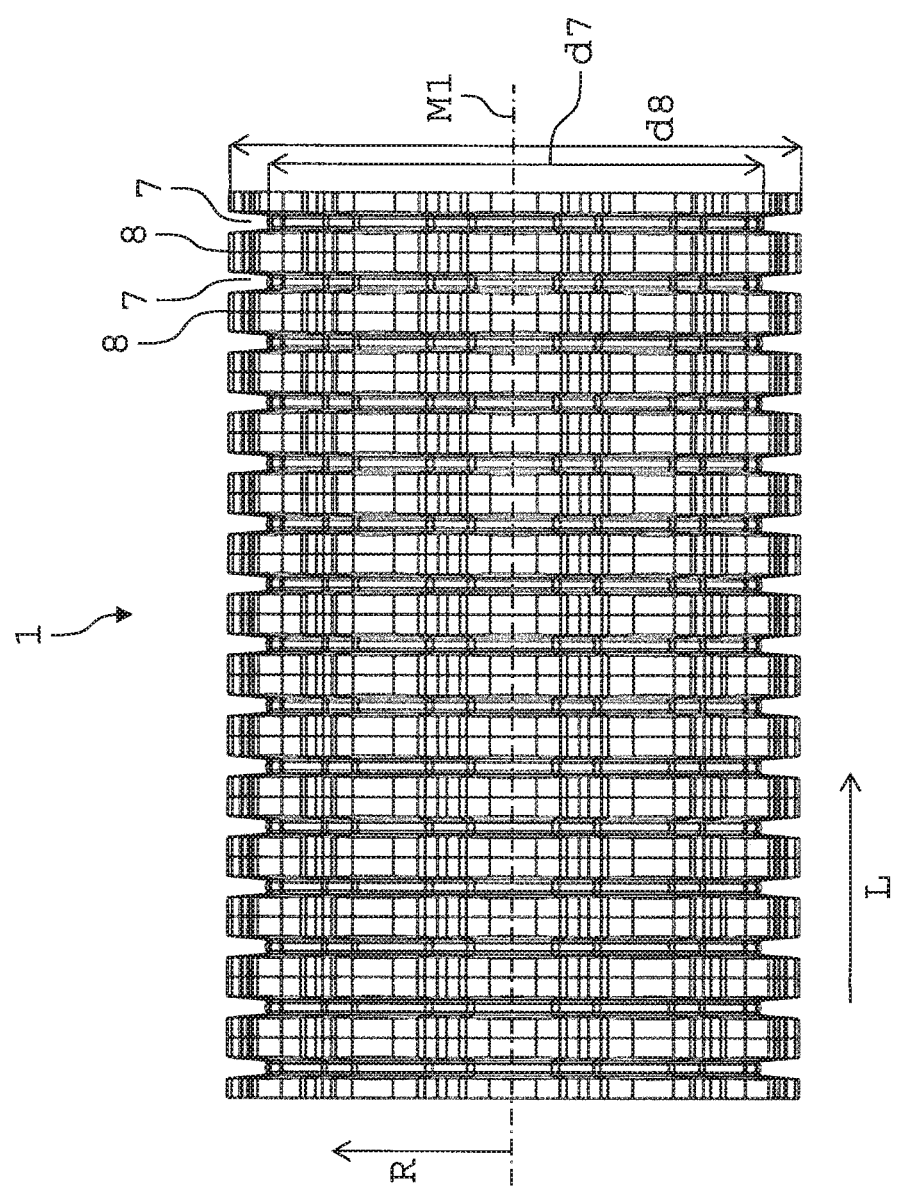
FIG. 2 shows a schematic lateral view of the composite tube according to FIG. 1.
Figure 3:
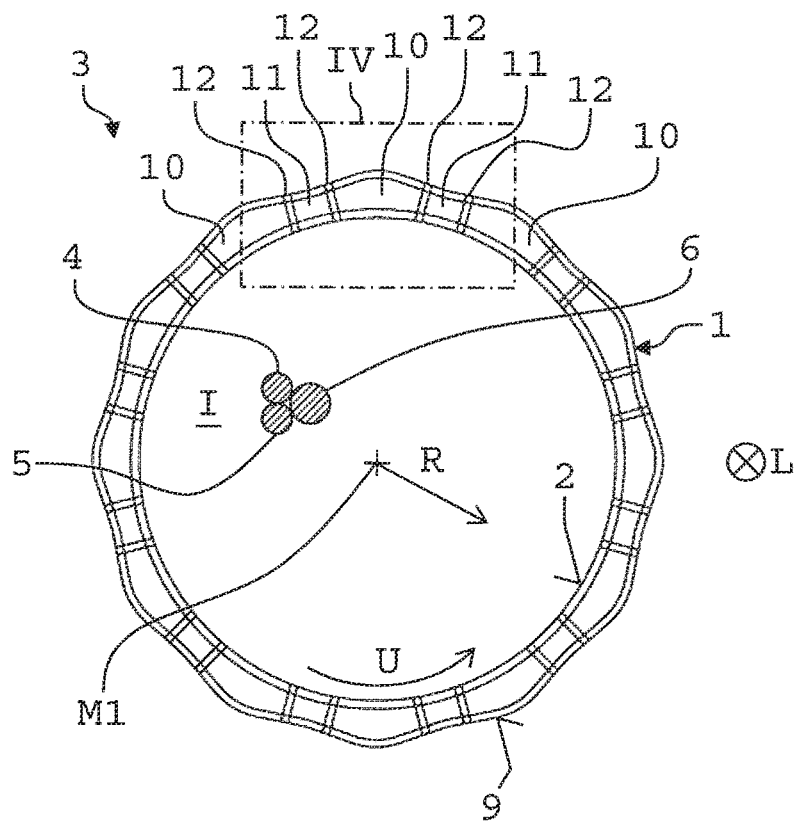
FIG. 3 shows a schematic front view of a wiring harness with a composite tube according to FIG. 1.
Figure 4:
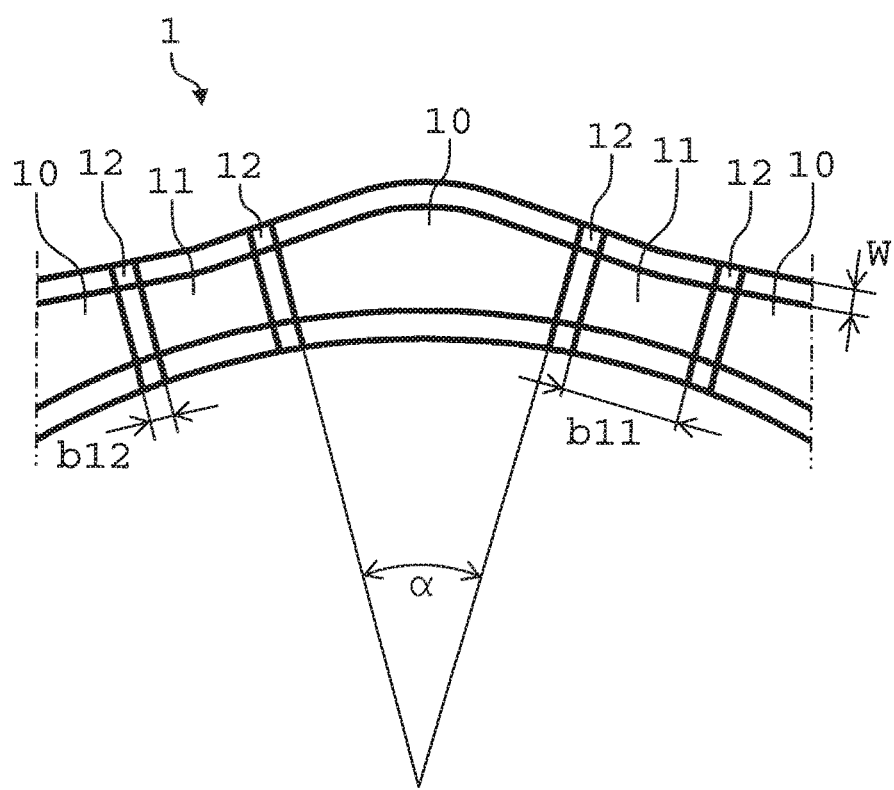
FIG. 4 shows the detailed view IV according to FIG. 3.

FIG. 1 shows a schematic perspective view of an embodiment of a composite tube 1. FIG. 2 shows a schematic lateral view of the composite tube 1, FIG. 3 shows a schematic front view of the composite tube 1, and FIG. 4 shows the detailed view IV according to FIG. 3. Below, reference is simultaneously made to FIGS. 1 to 4.

The composite tube 1 may also be called composite pipe. The composite tube 1 is called composite tube since it is produced from different plastic materials connected to one another. The composite tube 1 is in particular a corrugated tube or corrugated pipe or may also be called a corrugated tube or corrugated pipe. The plastic materials preferably differ chemically from one another.

The composite tube 1 may be designed to be rotation-symmetrical with respect to a center axis or axis of symmetry M1. The composite tube 1 has a longitudinal direction L. The longitudinal direction L is oriented in parallel to the axis of symmetry M1. The longitudinal direction L may be oriented in the orientation of FIGS. 1 and 2 from left to right or from right to left. The longitudinal direction L in FIGS. 1 and 2 is oriented from left to right. The longitudinal direction L may however also be oriented oppositely. The composite tube 1 furthermore has a radial direction R, which is oriented away from the axis of symmetry M1. The radial direction R is positioned orthogonally to the axis of symmetry M1. The radial direction R is in particular oriented away from the axis of symmetry M1 toward an inner wall 2 of the composite tube 1.

The composite tube 1 furthermore has a peripheral direction U, which may be oriented clockwise or counterclockwise. As FIG. 3 shows, the peripheral direction U may be oriented counterclockwise. The peripheral direction U is preferably oriented in parallel to the inner wall 2. The peripheral direction U may also be called the peripheral direction of the composite tube 1.

The composite tube 1 is in particular suitable for producing a wiring harness 3 shown in FIG. 3. To this end, a plurality of cables 4 to 6 are received in the composite tube 1, in particular in an internal space I of the composite tube 1. The cables 4 to 6 preferably fill the entire internal space I. The cables 4 to 6 may be called lines. The number of cables 4 to 6 is arbitrary. The cables 4 to 6 may have identical or different diameters and/or cross-sections as shown in FIG. 3. Together with the composite tube 1, the cables 4 to 6 form the wiring harness 3.

The wiring harness 3, or the composite tube 1, is preferably used in the field of motor vehicle technology. The wiring harness 3, or the composite tube 1, may however also be used in any other field. The cables 4 to 6 may be electrical cables, such as single-phase cables, multi-phase cables, coaxial cables, or the like, or fluid lines, such as fuel lines, diesel lines, kerosene lines, hydraulic lines, or pneumatic lines. The cables 4 to 6 extend in the longitudinal direction L.

The composite tube 1 comprises wave valleys 7 and wave crests 8, which alternate in the longitudinal direction L and of which only two each are provided with a reference sign in FIGS. 1 and 2. The wave valleys 7 and wave crests 8 are arranged in such a way that one wave crest 8 is respectively arranged between two wave valleys 7 and one wave valley 7 is respectively arranged between two wave crests 8. The wave valleys 7 and the wave crests 8 are provided on the composite tube 1 both on the outside and on the inside, i.e., facing the internal space I. For example, the wave valleys 7 and the wave crests 8 can be molded, after extrusion of the composite tube 1, onto the composite tube 1 by means of a so-called corrugator. The composite tube 1 has an inner diameter d7 at the wave valleys 7 and an outer diameter d8 at the wave crests 8. The outer diameter d8 is larger than the inner diameter d7.

As FIG. 3 shows, the composite tube 1 is provided with a corrugation 9 on the outside at least on the wave crests 8. In the peripheral direction U, the corrugation 9 extends completely around the composite tube 1. The corrugation 9 is formed by the first wall sections 10 and the second wall sections 11 being alternately arranged next to one another in the peripheral direction U. In this case, the first wall sections 10 extend in the radial direction R beyond the second wall sections 11. That is to say, the second wall sections 11 are recessed in the radial direction R with respect to the first wall sections 10.

Preferably provided is any number of first wall sections 10 and of second wall sections 11, which are arranged alternately and distributed evenly in the peripheral direction U. The number of first wall sections 10 matches the number of second wall sections 11. For example, twelve first wall sections 10 and twelve second wall sections 11 are provided. The corrugation 9 is preferably only provided in the region of the wave crests 8 and not in the region of the wave valleys 7.

The first wall sections 10 are produced from a first plastic material and the second wall sections 11 are produced from a second plastic material different from the first plastic material. The second plastic material is in particular softer than the first plastic material. The second plastic material may, for example, have a Shore A hardness in a range of preferably 10 to 70, and the first plastic material may have a Shore D hardness in a range of preferably 40 to 90. The first plastic material may, for example, be a polyamide (PA), and the second plastic material may, for example, be a thermoplastic elastomer (TPE), in particular a thermoplastic polyurethane (TPU), or an ethylene tetrafluoroethylene copolymer (ETFE). In particular, the first plastic material and the second plastic material cannot be mixed or can be mixed at least with difficulty. The first plastic material and the second plastic material are furthermore unsuitable for bonding to one another.

In order to connect the first wall sections 10 to the second wall sections 11, a plurality of third wall sections 12 is provided, which are produced from a third plastic material different from the first plastic material and the second plastic material. The third wall sections 12 are arranged in such a way that each first wall section 10 and each second wall section 11 is respectively arranged between two third wall sections 12. The number of third wall sections 12 is preferably twice as large as the number of first wall sections 10 or the number of second wall sections 11. For example, twenty-four such third wall sections 12 are provided.

In the peripheral direction U, a first wall section 10, a second wall section 11, and a third wall section 12 are respectively alternately arranged next to one another, wherein the third wall section 12 is arranged between the first wall section 10 and the second wall section 11 and acts as bonding agent between the first plastic material and the second plastic material. The third plastic material is preferably a modified polyolefin. In order to produce a modified polyolefin, a polyolefin can be modified in such a way that this previously insoluble polyolefin is soluble in organic solvents.

The first wall sections 10, the second wall sections 11, and the third wall sections 12 extend in the longitudinal direction L and are arranged in parallel to one another. The first wall sections 10, the second wall sections 11, and the third wall sections 12 in particular extend in parallel to the axis of symmetry M1. The first wall sections 10, the second wall sections 11, and the third wall sections 12 extend in the radial direction R over an entire wall thickness W of the composite tube 1. This is to be understood to mean that as viewed in the radial direction R, the first wall sections 10 are only formed with the first plastic material, the second wall sections 11 are only formed with the second plastic material, and the third wall sections 12 are only formed with the third plastic material. This in particular also means that the first plastic material, the second plastic material, and the third plastic material are arranged not one above the other as viewed in the radial direction R but exclusively next to one another as viewed in the peripheral direction U.

The first wall sections 10, the second wall sections 11, and the third wall sections 12 respectively extending over the entire wall thickness of the composite tube 1 as viewed in the radial direction R may however also be understood to mean that as viewed in the radial direction R, a very thin, in particular film-like, layer of the third plastic material is arranged on and/or under the second plastic material and/or on and/or under the third plastic material. That is to say, as viewed in the radial direction R, the third wall sections 12 may be arranged at least in sections above and/or below the third wall sections 10 and/or above and/or below the second wall sections 11. In terms of production technology, it is possible for this very thin layer of the third plastic material to form. The third wall section 12 may then have a cross-section with a T-shaped or a double-T-shaped or I-shaped geometry.

Each second wall section 11 preferably has one width b11 as viewed in the radial direction R. The second wall sections 11 may have a polygonal cross-section. The second wall sections 11 may however have a cross-section of any geometry. For example, the second wall sections 11 may also have a zigzag shape. Like the second wall sections 11, each third wall section 12 preferably also has one width b12 as viewed in the radial direction R. The third wall sections 12 may have a polygonal cross-section. The third wall sections 12 may however have a cross-section of any geometry. As viewed in the radial direction R, the first wall sections 10 preferably have a wedge-shaped geometry. The lateral edges of each first wall section 10 may in this case be inclined toward one another at an angle $\alpha$. That is to say, a respective cross-section of the first wall sections 10 increases from the axis of symmetry M1 as viewed in the radial direction R.

The chemically non-connectable first wall sections 10 can be connected to the second wall sections 11 by means of the third wall sections 12 produced from the third plastic material. More than the three previously described wall sections 10 to 12 may in particular also be provided so that more than three different plastic materials can be connected.

In order to produce the composite tube 1, the first plastic material of the first wall sections 10 is, for example, extruded by means of a main extruder. The second plastic material of the second wall sections 11 is supplied to the main extruder by means of a first ancillary extruder, and the third plastic material of the third wall sections 12 is supplied to the main extruder by means of a second ancillary extruder. If additional plastic materials or components are added, an additional ancillary extruder may be provided. The plastic materials supplied by means of the ancillary extruders may be injected in a spray head directly into a melt flow of the first plastic material.

Due to the flexibly deformable second wall sections 11 distributed evenly in the peripheral direction U, the composite tube 1 is very flexible without this flexibility being affected by the first wall sections 10 produced from the harder first plastic material. The second wall sections 11, which are produced from the softer, second plastic material, can in particular be selected and designed very specifically in view of the desired flexibility of the composite tube 1.

In contrast, the first wall sections 10, which are produced from the harder first plastic material and which protrude in the radial direction R beyond the second wall sections 11, are responsible for frictional processes that are triggered by moved surfaces adjacent thereto, wherein these surfaces can also be designed specifically by a suitable material selection in view of the desired friction properties as well as the wear resistance, without these adjacent surfaces affecting the properties of the second wall sections 11, which have a lower hardness.

Figure 5:
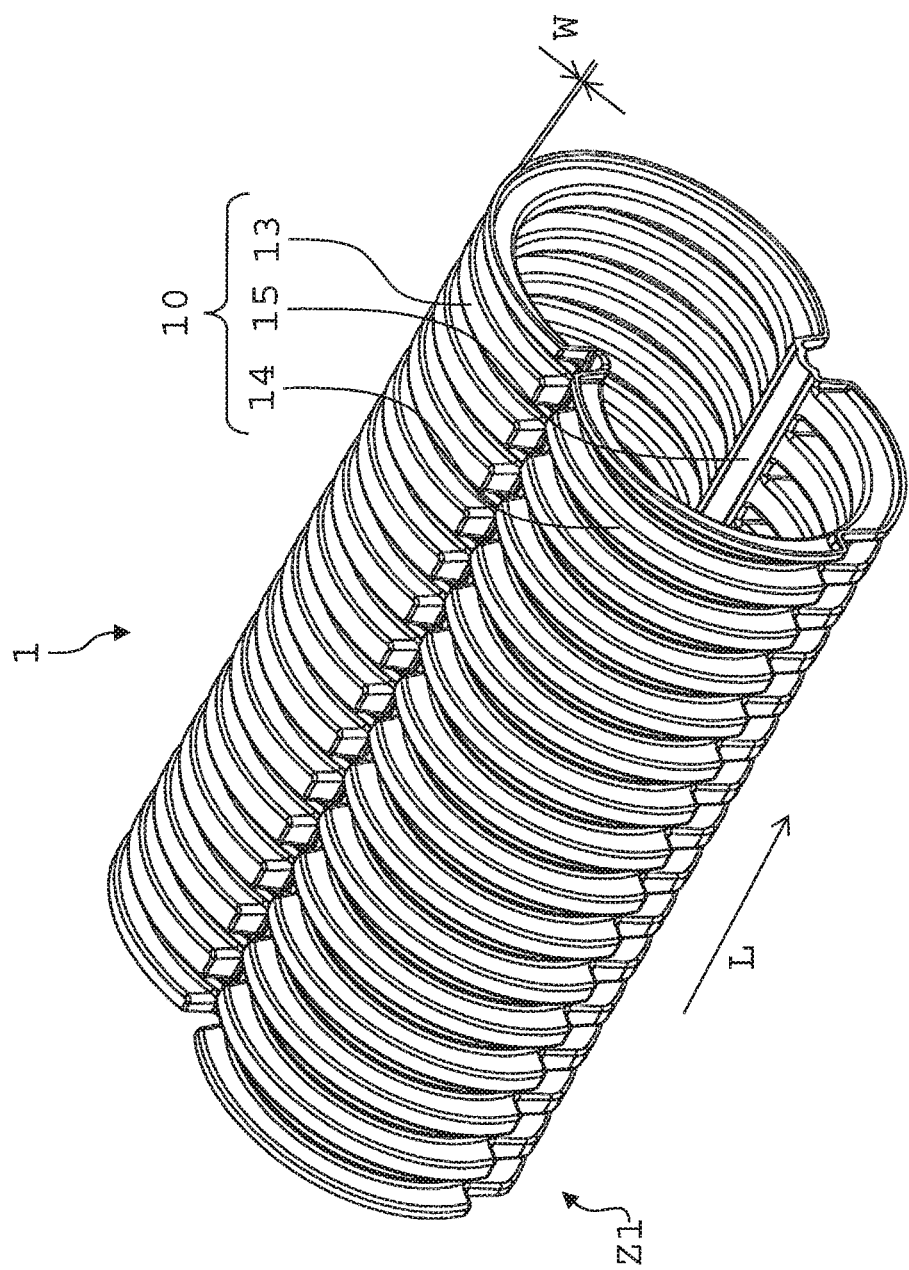
FIG. 5 shows a schematic perspective view of another embodiment of a composite tube.
Figure 6:
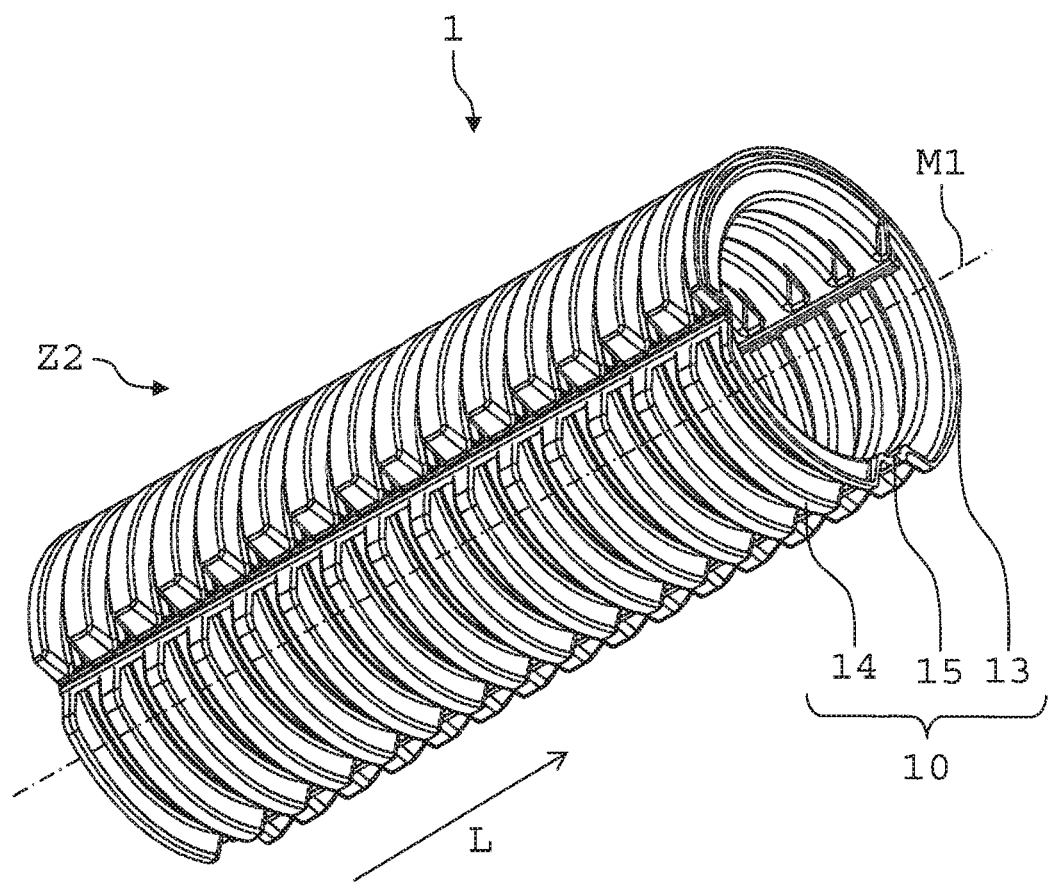
FIG. 6 shows another schematic perspective view of the composite tube according to FIG. 5.
Figure 7:
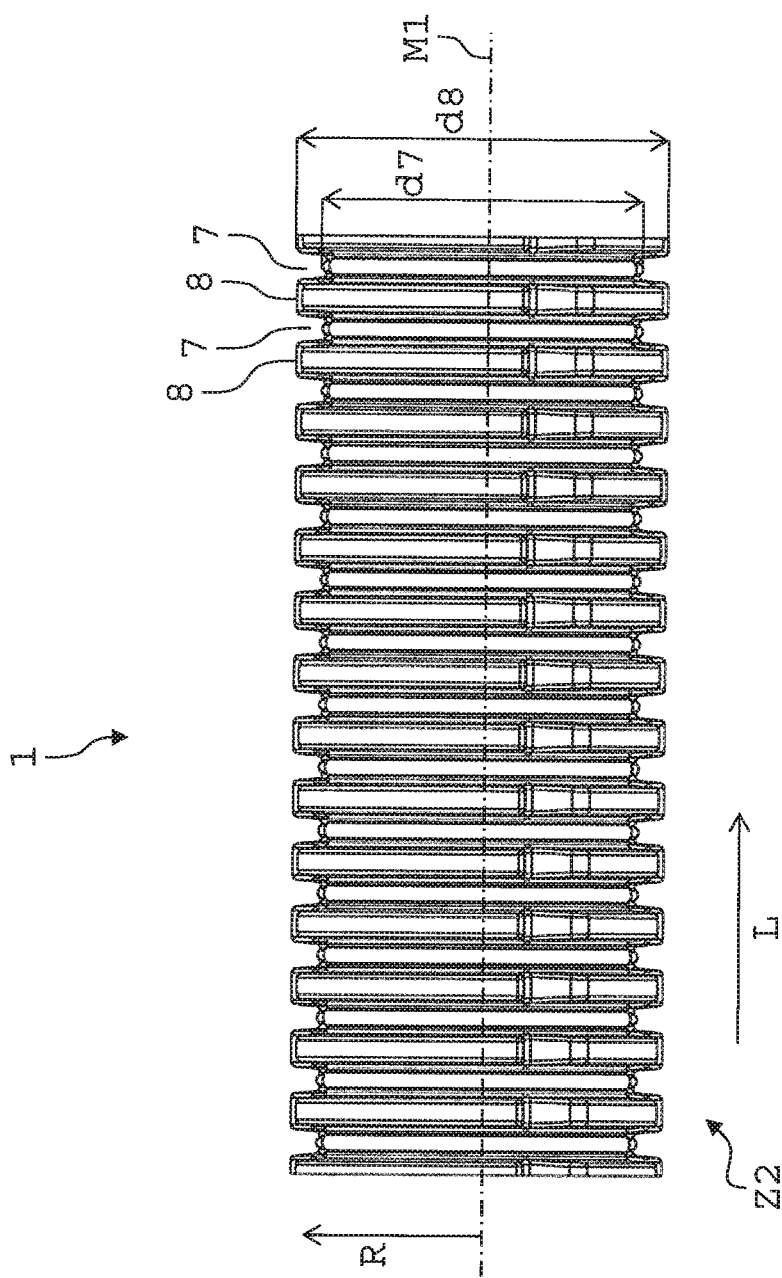
FIG. 7 shows a schematic lateral view of the composite tube according to FIG. 5.

FIGS. 5 and 6 respectively show a schematic perspective view of a further embodiment of a composite tube 1. FIG. 7 shows a schematic lateral view of the composite tube 1, FIGS. 8 and 9 respectively show a schematic front view of the composite tube 1, and FIG. 10 shows the detailed view X according to FIG. 8. Below, reference is simultaneously made to FIGS. 5 to 10.

Figure 8:
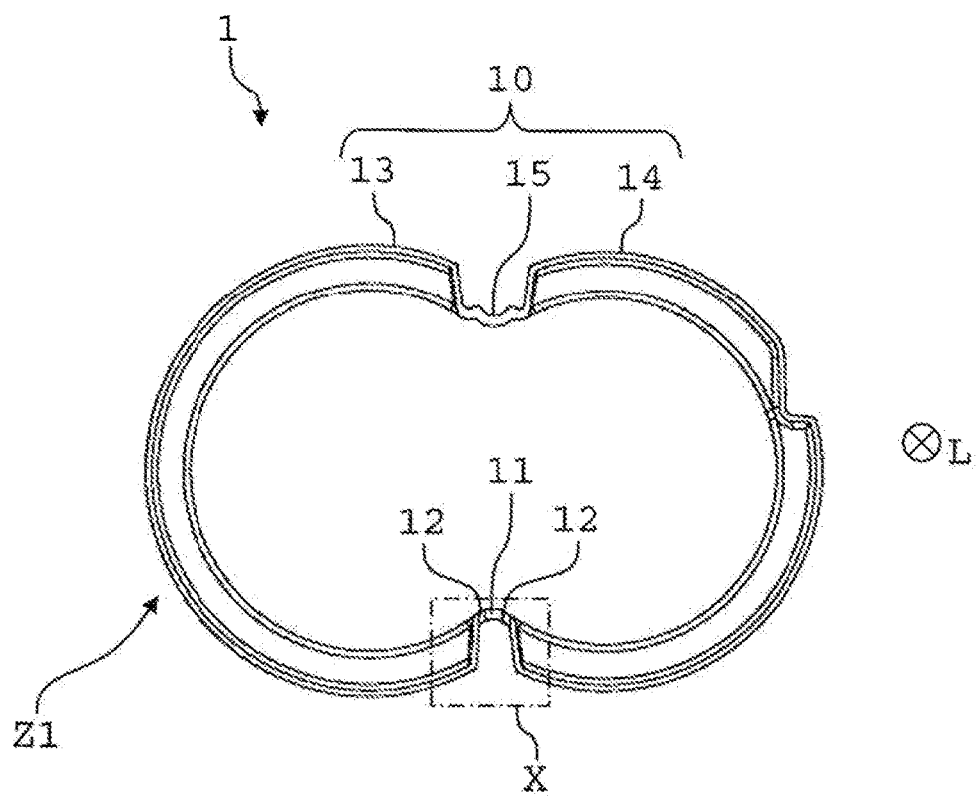
FIG. 8 shows a schematic front view of the composite tube according to FIG. 5.
Figure 9:
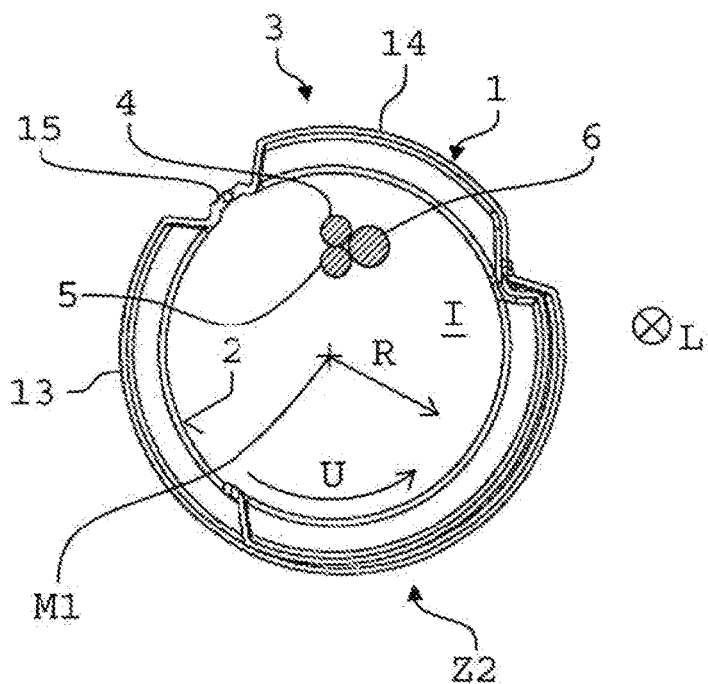
FIG. 9 shows a schematic front view of a wiring harness with a composite tube according to FIG. 5.
Figure 10:
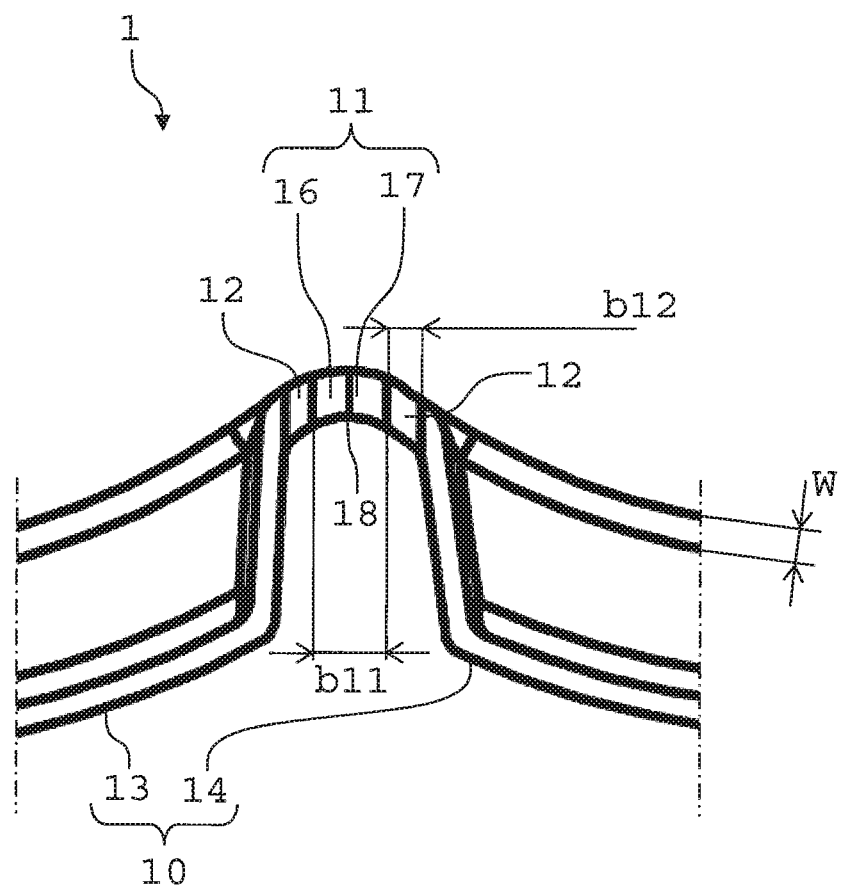
FIG. 10 shows the detailed view X according to FIG. 8.

The composite tube 1 according to FIGS. 5 to 10 differs from the composite tube 1 according to FIGS. 1 to 4 in that the composite tube 1 according to FIGS. 5 to 10 does not have any corrugation 9 and that the composite tube 1 according to FIGS. 5 to 10 can be brought from an open or folded-open state Z1 shown in FIGS. 5 and 8 into a closed or folded-together state Z2 shown in FIGS. 6, 7, and 9 in order to form the wiring harness 3. To this end, the composite tube 1 has a first corrugated tube shell 13, a second corrugated tube shell 14, and a joint section 15 at which the first corrugated tube shell 13 and the second corrugated tube shell 14 are pivotably connected to one another.

In the longitudinal direction L, the corrugated tube shells 13, 14 have alternately arranged wave valleys 7 and wave crests 8. The joint section 15 is free of wave valleys 7 and wave crests 8. That is to say, the joint section 15 is smooth and not corrugated. The first corrugated tube shell 13, the second corrugated tube shell 14, and the joint section 15 are formed from a single piece of material. The first corrugated tube shell 13, the second corrugated tube shell 14, and the joint section 15 in particular form a first wall section 10 of the composite tube, which is produced from the aforementioned first plastic material.

Alternatively, the joint section 15 may also be produced from a different plastic material than the corrugated tube shells 13, 14. For example, the corrugated tube shells 13, 14 may be produced from the first plastic material and the joint section 15 may be produced from the second plastic material. The joint section 15 is then a second wall section 11 of the composite tube 1. A third wall section 12, which is produced from the third plastic material and connects the joint section 15 to the corrugated tube shells 13, 14, may then respectively be provided between the joint section 15 and the corrugated tube shells 13, 14.

In order to form a wiring harness 3 shown in FIG. 9, cables 4 to 6 are laid into the composite tube 1 in the folded-open state Z1, and this composite tube is brought from the folded-open state Z1 into the folded-together state Z2, wherein the second corrugated tube shell 14 is arranged at least in sections within the first corrugated tube shell 13. When the composite tube 1 is brought from the folded-open state Z1 into the folded-together state Z2, the corrugated tube shells 13, 14 pivot about the joint section 15.

The composite tube 1 furthermore comprises a second wall section 11, which forms an elastically deformable sealing lip of the composite tube 1. The second wall section 11 is produced from the second plastic material different from the first plastic material. The second wall section 11 has a first lip section 16 provided on the first corrugated tube shell 13 and a second lip section 17 which is separate from the first lip section 16 and provided on the second corrugated tube shell 14.

The first lip section 16 being separate from the second lip section 17 is to be understood to mean that a cut or slit 18 is provided between the first lip section 16 and the second lip section 17. The slit 18 extends along the longitudinal direction L. Alternatively, such a lip section 16, 17 may also be provided on only one of the corrugated tube shells 13, 14.

A third wall section 12, which is produced from the third plastic material different from the first plastic material and the second plastic material, is provided between the first corrugated tube shell 13 and the first lip section 16. Such a third wall section 12 is also provided between the second lip section 17 and the second corrugated tube shell 14. The arrangement and the functionality of the wall sections 10 to 12 correspond to the arrangement and the functionality of the wall sections 10 to 12 of the composite tube 1 according to FIGS. 1 to 4.

Although the present invention was described based on exemplary embodiments, it can be modified in various ways.

LIST OF REFERENCE CHARACTERS

1 Composite tube
2 Inner wall
3 Wiring harness
4 Cable
5 Cable
6 Cable
7 Wave valley
8 Wave crest
9 Corrugation
10 Wall section
11 Wall section
12 Wall section
13 Corrugated tube shell
14 Corrugated tube shell
15 Joint section
16 Lip section
17 Lip section
18 Slit
b11 Width
b12 Width
d7 Inner diameter
d8 Outer diameter
I Internal space
L Longitudinal direction
M1 Axis of symmetry
R Radial direction
U Peripheral direction
W Wall thickness
Z1 State
Z2 State
α Angle

The invention claimed is:

1. Composite tube, in particular corrugated tube, comprising a first wall section produced from a first plastic material, a second wall section produced from a second plastic material different from the first plastic material, and a third wall section produced from a third plastic material different from the first plastic material and the second plastic material, the first wall section, the second wall section, and the third wall section being adjacently arranged in a peripheral direction of the composite tube, the third wall section being arranged between the first wall section and the second wall section and connecting the first wall section to the second wall section, and the first wall section, the second wall section, and the third wall section respectively extending in a radial direction of the composite tube over an entire wall thickness thereof.

2. Composite tube according to claim 1, furthermore comprising a plurality of first wall sections, second wall sections, and third wall sections, wherein each first wall section is arranged between two third wall sections and each second wall section is arranged between two third wall sections.

3. Composite tube according to claim 1, wherein the first wall section, the second wall section, and the third wall section extend in a longitudinal direction of the composite tube and are arranged in parallel to one another.

4. Composite tube according to claim 1, wherein the second plastic material has properties different from the first plastic material.

5. Composite tube according to claim 1, wherein the third plastic material acts as a bonding agent between the first plastic material and the second plastic material.

6. Composite tube according to claim 1, wherein the first plastic material is a polyamide, the second plastic material is a thermoplastic elastomer or an ethylene tetrafluoroethylene copolymer, and the third plastic material is a modified polyolefin.

7. Composite tube according to claim 1, further comprising wave valleys and wave crests alternating in a longitudinal direction of the composite tube.

8. Composite tube according to claim 1, wherein the first wall section extends in the radial direction beyond the second wall section.

9. Composite tube according to claim 1, wherein the first wall section has a first corrugated tube shell, a second corrugated tube shell, and a joint section at which the first corrugated tube shell and the second corrugated tube shell are pivotably connected to one another, and wherein the second wall section forms an elastically deformable sealing lip.

10. Composite tube according to claim 9, wherein the second wall section has a first lip section provided on the first corrugated tube shell and a second lip section which is separate from the first lip section and provided on the second corrugated tube shell.

\* \* \* \* \*